(12) United States Patent
Itagaki

(10) Patent No.: US 9,888,152 B2
(45) Date of Patent: Feb. 6, 2018

(54) IMAGE FORMING APPARATUS

(71) Applicant: CANON KABUSHIKI KAISHA, Tokyo (JP)

(72) Inventor: Tomohisa Itagaki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/225,614

(22) Filed: Aug. 1, 2016

(65) Prior Publication Data
US 2017/0041509 A1 Feb. 9, 2017

(30) Foreign Application Priority Data

Aug. 7, 2015 (JP) .................................. 2015-157610

(51) Int. Cl.
| | |
|---|---|
| H04N 1/60 | (2006.01) |
| G03G 15/01 | (2006.01) |
| H04N 1/00 | (2006.01) |
| H04N 1/028 | (2006.01) |
| H04N 1/405 | (2006.01) |
| G03G 15/00 | (2006.01) |

(52) U.S. Cl.
CPC .......... *H04N 1/6027* (2013.01); *G03G 15/01* (2013.01); *G03G 15/0131* (2013.01); *G03G 15/5016* (2013.01); *G03G 15/5062* (2013.01); *H04N 1/00795* (2013.01); *H04N 1/02895* (2013.01); *H04N 1/405* (2013.01); *H04N 1/6005* (2013.01); *H04N 1/6008* (2013.01); *H04N 1/6019* (2013.01); *H04N 1/6044* (2013.01); *G03G 15/0189* (2013.01)

(58) Field of Classification Search
CPC ............... G03G 15/01; G03G 15/0131; G03G 15/5016; G03G 15/5062; G03G 15/0189; H04N 1/00795; H04N 1/02895; H04N 1/405; H04N 1/6005; H04N 1/6008; H04N 1/6019; H04N 1/6044
See application file for complete search history.

(56) References Cited

U.S. PATENT DOCUMENTS

| | | |
|---|---|---|
| 6,697,167 B1 | 2/2004 | Takahashi |
| 6,959,157 B2 | 10/2005 | Nakayama |

*Primary Examiner* — Christopher D Wait
(74) *Attorney, Agent, or Firm* — Canon U.S.A., Inc. IP Division

(57) ABSTRACT

An image forming apparatus includes a conversion unit, a correction unit, an image forming unit, a measurement unit, first, second, and third generation units, a reading unit, an input unit, and a determination unit. Image data of a color components indicating one pixel based on a multidimensional table is converted and then corrected based on one-dimensional tables corresponding to the color components. An image is formed on a sheet based on the corrected image data. A measuring image formed on the sheet is measured. The multidimensional table can be generated based on a multi-color first measuring image. The one-dimensional table can be generated based on a second measuring image. A pattern image formed on the sheet is read. The one-dimensional table can be generated based on a pattern image for each of the color components on the sheet. Input user instructions indicated how the one-dimensional table is generated.

13 Claims, 14 Drawing Sheets

190 Dot

230 Dot

COPIA

ERROR DIFFUSION

IMAGE FORMING APPARATUS

BACKGROUND OF THE INVENTION

Field of the Invention

The present invention relates to an image quality adjustment control performed by an image forming apparatus.

Description of the Related Art

Electrophotographic type image forming apparatuses form an electrostatic latent image by exposing a photosensitive member and form an image by developing the electrostatic latent image with a developing agent. The density of an image formed by such image forming apparatuses tends to vary depending on environmental conditions (e.g., temperature and humidity) of the image forming apparatuses or depending on a charging amount of the developing agent. Thus, the image forming apparatuses form a measuring image and control image forming conditions for adjusting the density of the image based on a result of the measurement of the measuring image acquired by a sensor.

An image forming apparatus discussed in U.S. Pat. No. 6,697,167 includes a reader unit that reads an original document. According to the discussed image forming apparatus, a measuring image is formed on a sheet and the reader unit reads the measuring image. Then, the image forming apparatus controls the image forming conditions based on a reading result obtained by the reader unit.

Further, an image forming apparatus discussed in U.S. Pat. No. 6,959,157 includes a color sensor provided to a conveyance path along which a sheet is conveyed. According to the discussed image forming apparatus, a measuring image is formed on a sheet and the color sensor reads the measuring image. Then, the image forming apparatus controls the image forming conditions based on a measurement result obtained by the color sensor.

According to the image forming apparatus discussed in U.S. Pat. No. 6,697,167, a user has to place the sheet, on which the measuring image is formed, on the reader unit, which troubles the user.

On the other hand, according to the image forming apparatus discussed in U.S. Pat. No. 6,959,157, a user can save the trouble because the measuring image can be automatically measured while the sheet is being conveyed along the conveyance path. However, according to the image forming apparatus discussed in U.S. Pat. No. 6,959,157, a measuring range of the color sensor is narrowly limited to only a partial area of the measuring image formed on the conveyed sheet that passes through a measurement position of the color sensor. To the contrary, the reader unit of the image forming apparatus discussed in U.S. Pat. No. 6,697, 167 can measure the entire measuring image even if the size of the measuring image is comparable to the entire surface of the sheet.

As such, compared to the image forming apparatus that measures the measuring image with the reader unit, the image forming apparatus that measures the measuring image with the color sensor is disadvantageous in the number of measuring images that can be formed on the sheet. In other words, if the same number of measuring images is to be measured, the number of sheets consumed by the image forming apparatus that measures the measuring images with the color sensor is greater than the number of sheets consumed by the image forming apparatus that measures the measuring images with the reader unit.

SUMMARY OF THE INVENTION

According to an aspect of the present invention, an image forming apparatus includes a conversion unit configured to convert image data of a plurality of color components indicating one pixel based on a multidimensional table, a correction unit configured to correct the converted image data based on one-dimensional tables, each one-dimensional table respectively corresponding to the plurality of color components, an image forming unit configured to form an image on a sheet based on the corrected image data, a measurement unit configured to measure a measuring image formed on the sheet, a first generation unit configured to control the image forming unit to form a first measuring image on the sheet, control the measurement unit to measure the first measuring image, and generate the multidimensional table based on a result of the measurement of the first measuring image, wherein the first measuring image is a multi-color image, a second generation unit configured to control the image forming unit to form a second measuring image for each of the plurality of color components on the sheet, control the measurement unit to measure the second measuring image, and generate the one-dimensional table based on a result of the measurement of the second measuring image, a reading unit configured to read a pattern image formed on the sheet, a third generation unit configured to control the image forming unit to form a pattern image for each of the plurality of color components on the sheet, control the reading unit to read the pattern image, and generate the one-dimensional table based on a result of the reading of the pattern image, an input unit configured to input user instruction information indicating whether to use the measurement unit or to use the reading unit to generate the one-dimensional table, and a determination unit configured to determine, based on the user instruction information input by the input unit, whether to cause the second generation unit to generate the one-dimensional table or cause the third generation unit to generate the one-dimensional table.

Further features of the present invention will become apparent from the following description of exemplary embodiments with reference to the attached drawings.

DESCRIPTION OF THE EMBODIMENTS (Configuration of Image Forming Apparatus)

Figure 1:
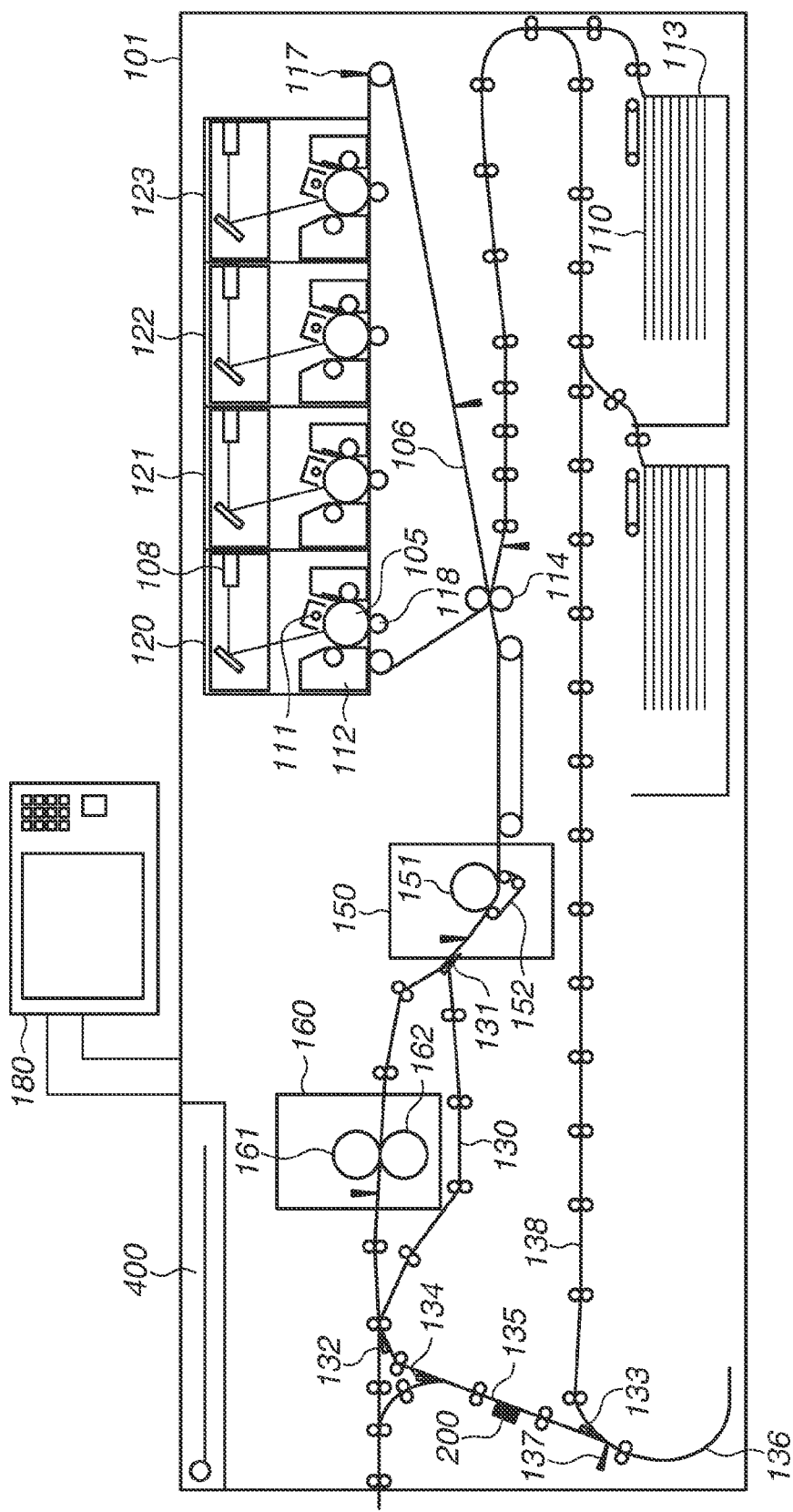
FIG. 1 is a cross-sectional view schematically illustrating an image forming apparatus.

An image forming apparatus will be described in detail below with reference to FIG. 1. An image forming apparatus includes a printer unit 101, a reader unit 400, and an operation unit 180. The printer unit 101 includes four stations 120, 121, 122, and 123, which form images of respective color components. The station 120 forms a yellow image. The station 121 forms a magenta image. The station 122 forms a cyan image. The station 123 forms a black image.

Respective stations 120, 121, 122, and 123 are not different from each other in configuration. A configuration of the station 120, which forms yellow images, will be described below. A photosensitive drum 105 is a photosensitive member that includes a photosensitive layer formed on a surface thereof, and is charged by a charging device 111. An electrostatic latent image is formed on the photosensitive drum 105 by scanning the photosensitive drum 105 with a laser of an exposure apparatus 108 that is controlled based on image data. A developing unit 112 includes a storage portion that accommodates a developing agent, which includes toner and a magnetic carrier. The developing unit 112 develops an electrostatic latent image with the developing agent provided in the storage portion. In this way, a toner image can be formed on the photosensitive drum 105. The charging device 111 and the exposure apparatus 108 are functions as a latent image forming unit configured to form an electrostatic latent image.

A primary transfer roller 118 transfers the toner image formed on the photosensitive drum 105 onto an intermediate transfer belt 106 when a transfer voltage is applied by a power supply unit (not illustrated). When four color toner images formed by respective stations 120, 121, 122, and 123 are transferred to the intermediate transfer belt 106 in such a manner that these toner images are overlapped with each other, a full-color toner image can be formed on the intermediate transfer belt 106. The toner image carried by the intermediate transfer belt 106 can be conveyed to a secondary transfer roller 114 in accordance the rotation of the intermediate transfer belt 106.

Each sheet 110 accommodated in a cassette 113 can be conveyed toward the secondary transfer roller 114 in synchronization with the toner image on the intermediate transfer belt 106. When a transfer voltage is applied to the secondary transfer roller 114, the toner image carried on the intermediate transfer belt 106 can be transferred from the secondary transfer roller 114 to the sheet 110. Then, the sheet 110 on which the toner image has been transferred can be conveyed to fixing devices 150 and 160. The intermediate transfer belt 106 is functionally operable as an image carrier that can carry the image formed by the printer unit 101. Further, the secondary transfer roller 114 is functionally operable as a transfer unit configured to transfer the toner image carried on the image carrier to the sheet 110.

The fixing devices 150 and 160 can heat and press the toner image transferred on the sheet 110 to fix the toner image on the sheet 110. The fixing device 150 includes a fixing roller 151 and a pressing belt 152. The fixing roller 151 includes a heater that can heat the sheet 110. The pressing belt 152 can press the sheet 110 against the fixing roller 151. The fixing device 160 is disposed on a downstream side of the fixing device 150 in the conveyance direction of the sheet 110. The fixing device 160 can impart gloss to the toner image on the sheet 110 having passed through the fixing device 150. The fixing device 160 includes a fixing roller 161 and a pressing roller 162. The fixing roller 161 includes a heater that heats the sheet 110.

In a case where the operation for fixing an image on the sheet 110 is performed in a gloss imparting mode, or when the sheet 110 on which an image is fixed is a thick paper or the like that requires a large amount of heat, the sheet 110 having passed through the fixing device 150 is conveyed to the fixing device 160. If the sheet 110 on which an image is fixed is a plain paper or a thin paper, the sheet 110 having passed through the fixing device 150 is conveyed along a conveyance path 130 that detours the fixing device 160. The angle of the flapper 131 can be controlled to convey the sheet 110 to the fixing device 160 or to the conveyance path 130 (i.e., the detour path).

A flapper 132 is a guide member that can selectively guide the sheet 110 to a conveyance path 135 or to an external conveyance path 139. The sheet 110 conveyed along the conveyance path 135 can be conveyed to a reversing unit 136. A reversing sensor 137 is provided in the conveyance path 135 to detect a rear end of the sheet 110. The conveyance direction of the sheet 110 can be reversed in response to a detection signal of the reversing sensor 137.

A flapper 133 is a guide member that can selectively guide the sheet 110 to a conveyance path 138 dedicated to two-sided image formation or to the conveyance path 135. When the selected mode is a facedown discharge mode, the sheet 110 can be conveyed again into the conveyance path 135 and discharged from the image forming apparatus.

On the other hand, when the selected mode is a two-sided print mode, the sheet 110 can be conveyed again to the transfer roller 114 along the conveyance path 138. In the two-sided print mode, the sheet 110 causes a switch-back motion in the reversing unit 136 after an image is fixed on a first surface of the sheet 110. Then, the sheet 110 can be conveyed to the transfer roller 114 along the conveyance path 138. Therefore, an image can be formed on a second surface of the sheet 110.

A flapper 134 is a guide member that guides the sheet 110 to a conveyance path via which the sheet 110 is discharged from the image forming apparatus. When the sheet 110 is discharged in the facedown discharge mode, the flapper 134 guides the sheet 110 to the conveyance path for discharge after the sheet 110 is switched back in the reversing unit 136. The sheet 110 conveyed along the conveyance path for discharge is discharged to the outside of the image forming apparatus.

A plurality of conveyance rollers that cooperatively conveys the sheet 110 and a plurality of spectral color sensors 200, which can measure the density of a measuring image on the sheet 110, are disposed on the conveyance path 135. More specifically, four spectral color sensors 200 are arrayed sequentially in a direction perpendicular to the conveyance direction of the sheet 110, in such a way as to detect 4-row test charts. The spectral color sensor 200 will be described in detail below with reference to FIG. 2.

The operation unit 180 includes a touch panel type liquid crystal screen and a key input unit. The operation unit 180 is an interface that enables a user to input the number of images to be printed and a desired print mode. More specifically, the user can manipulate the operation unit 180 to select a one-sided print mode or the two-sided print mode, designate the facedown discharge mode, or select a monochrome mode or a color mode.

The reader unit 400 includes a carriage and a document positioning plate. A light source, an optical system, and a CCD sensor are installed on the carriage to read an image of a document placed on the document positioning plate. The reader unit 400 can start a reading operation when a user presses a reading start button provided on the operation unit 180 in a state where the document is placed on the document positioning plate. When the reader unit 400 performs the reading operation, light emitted from the source light is reflected on the document placed on the document positioning plate. The reflection light from the document focus on the CCD sensor via the optical system (e.g., lenses). In a state where the reflection light from the document forms an image on the CCD sensor, luminance data indicating a document reading result can be acquired. The reader unit 400 can move the carriage in a predetermined direction to acquire luminance data of one document page.

(Spectral Color Sensor)

Figure 2:
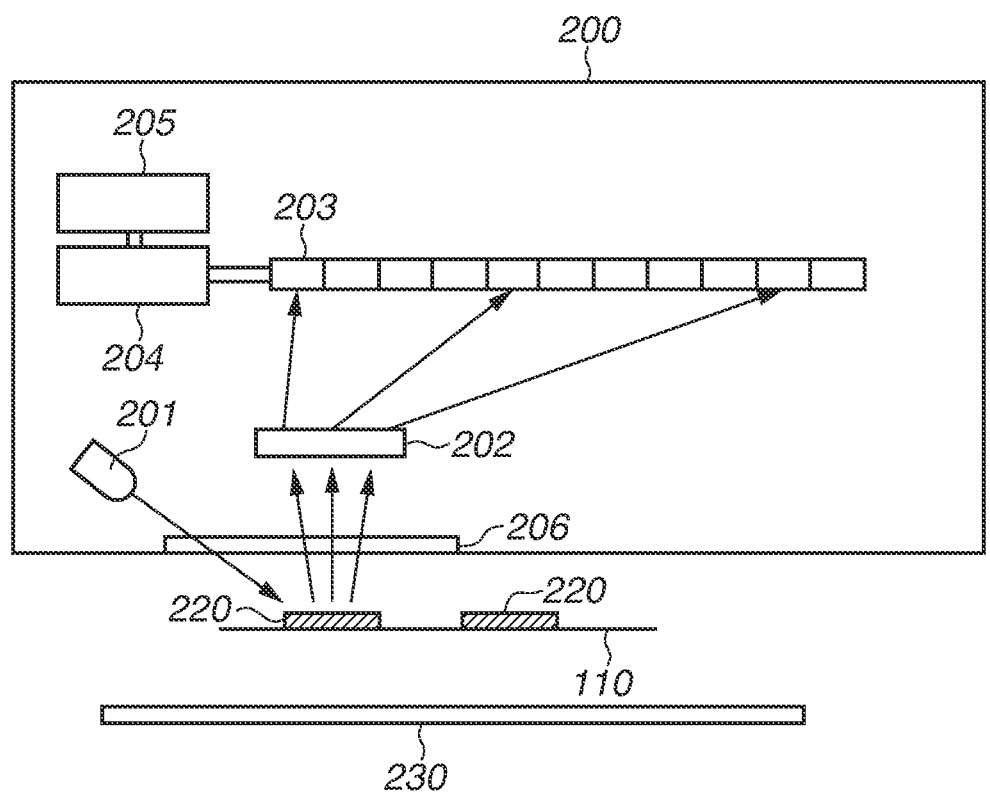
FIG. 2 is a cross-sectional view illustrating an essential part of a spectral color sensor.

FIG. 2 illustrates a structure of the spectral color sensor 200. The spectral color sensor 200 is provided on a downstream side of the fixing device 150, in the conveyance direction of the sheet 110.

The spectral color sensor 200 includes a white LED 201, a diffraction grating 202, a line sensor 203, a calculation unit 204, and a memory 205, which are provided in the sensor body. The white LED 201 is a light-emitting element that can irradiate a measuring image 220 on the sheet 110 with light. More specifically, the white LED 201 is functionally operable as an irradiation unit configured to emit light. The diffraction grating 202 can separate the light reflected on the measuring image 220 for each wavelength. The line sensor 203 is a light detection element that is composed of "n" pieces of light reception elements, which can detect the light separated by the diffraction grating 202 for each wavelength. More specifically, the diffraction grating 202 diffracts the light for each of a plurality of wavelengths and the line sensor 203, which serves as a light reception unit, outputs a signal indicating the intensity of light for each wavelength. The calculation unit 204 can perform various calculations based on light intensity values of respective pixels detected by the line sensor 203.

The memory 205 stores various data used by the calculation unit 204. The calculation unit 204 includes, for example, a spectral calculation unit that can acquire spectral data based on the light intensity values and a Lab calculation unit that can calculate Lab values. Further, an appropriate number of condensing lens can be additionally provided. For example, providing a condensing lens associated with the white LED 201 is useful because the light emitted from the white LED 201 can be surely converged on the measuring image 220 of the sheet 110. Similarly, providing a condensing lens associated with the diffraction grating 202 is useful because the light reflected from the measuring image 220 can be surely converged on the diffraction grating 202.

In accordance with International Organization for Standardization (ISO) 13655 standards, a white reference plate 230 is provided in such a way as to be opposed to the spectral color sensor 200. It is desired that the white reference plate 230 is excellent in light resistance and has sufficient mechanical durability to suppress time-related deterioration. The white reference plate 230 is made of, for example, an aluminum oxide material being subjected to ceramic processing. Further, the white reference plate 230 is provided independently for each of four spectral color sensors 200a, 200b, 200c, and 200d. The white reference plate 230 is attachable to or detachable from a sensor surface of the spectral color sensor 200.

If the sheet 110 fluctuates while it moves along a conveyance path, it is impossible to perform accurate measurement because the distance between the sheet 110 and the color sensor 200 changes. Therefore, to realize highly accurate measurement, it is desired to measure the measuring image 220 with the color sensor 200 in a state where a roller (not illustrated) presses a back surface of the sheet 110 on which the measuring image 220 is formed.

(Reader Unit)

The reader unit 400 installed on the printer unit 101 includes a white LED, a plurality of mirrors and lenses, and a CMOS sensor having RGB filters. If a user places a document on the document positioning plate and presses a reading start key of the operation unit 180, the white LED irradiates the document with light. The CMOS sensor can receive reflection light from the document via the plurality of mirrors and lenses. The CMOS sensor transfers RGB luminance signals to a controller of the image forming apparatus based on the reflection light from the document. In the present exemplary embodiment, RGB stands for red (R), green (G), and blue (B). Further, the reader unit 400 is functionally operable as a reading unit configured to read a pattern image formed on the sheet 110 and acquire luminance information about the pattern image.

(Configuration of Controller)

A control block diagram of the image forming apparatus will be described in detail below with reference to FIG. 3. A central processing unit (CPU) 300 is a control circuit that can control each unit of the image forming apparatus. A read only memory (ROM) 301 stores a control program that can be executed by the CPU 300 to perform various processing described in detail below with reference to flowcharts described below. A random access memory (RAM) 303 is a system work memory that can be used when the CPU 300 performs operations.

The printer unit 101 is an assembled unit that includes the stations 120, 121, 122, and 123, the primary transfer roller 118, the intermediate transfer belt 106, the secondary transfer roller 114, the fixing device 150, and the fixing device 160. The operation unit 180 and the reader unit 400 are already described in detail and therefore redundant description thereof will be avoided. An I/F unit 302 is an interface that can receive image data when the image data is transferred from an external apparatus (e.g., a PC or a scanner).

A color processing unit 315 can perform image processing on luminance signals received from the reader unit 400 to generate image data. Similarly, the color processing unit 315 can perform image processing on image data received from the external apparatus (e.g., the PC or the scanner) to convert the external image data into print-oriented image data. In the present exemplary embodiment, the print-oriented image data includes image data dedicated to a yellow component, image data dedicated to a magenta component, image data dedicated to a cyan component, and image data dedicated to black component.

Further, the color processing unit 315 can adjust image signal values of respective color components that represent one pixel included in the image data with reference to an ICC profile 309 dedicated to the adjustment of tint. The color processing unit 315 can convert the adjusted image signal values into image data, based on which the image forming apparatus can form an image having a target tint on the sheet 110. For example, to obtain a target tint for a mixed color image composed of the yellow, magenta, cyan, and black components, the color processing unit 315 adjusts the ratio of yellow, magenta, cyan, and black colors with reference to the ICC profile 309. In the present exemplary embodiment, the ICC profile 309 is a four-dimensional table that can be referred to in conversion from yellow, magenta, cyan, and black input values to yellow, magenta, cyan, and black output values. Therefore, the image data converted by the color processing unit 315 includes yellow image data, magenta image data, cyan image data, and black image data.

A gradation correction unit 316 can correct the image data generated by the color processing unit 315, with reference to a gradation correction table 310 (γ LUT), to form an image having a predetermined density. In general, the density of an image formed by the printer unit 101 is different from a desired density. Therefore, the gradation correction unit 316 converts input values of the image data (i.e., image signal values) so that the image formed by the printer unit 101 has the desired density.

In the present exemplary embodiment, the gradation correction table 310 is prepared for each screen described below and prepared for each color. Therefore, the gradation correction unit 316 can identify a desired screen for the image data and can correct input values of the yellow image data with reference to a yellow gradation correction table that corresponds to the identified screen. The gradation correction unit 316 can identify a desired screen when the image data to be converted is magenta, cyan, or black image data and can convert the image data with reference to a dedicated color gradation correction table that correspond to the identified screen. The gradation correction table 310 (γ LUT), which is prepared for each color, is a one-dimensional table that is usable to correct the image data.

The color processing unit 315 and the gradation correction unit 316 can be realized by an integrated circuit (e.g., ASIC), or can be realized by the CPU 300 that is capable of converting image data based on a program stored beforehand.

A halftone processing unit 317 can perform screening suitable for the image data converted by the gradation correction unit 316, which is optimized considering the type of the processed image. For example, in the image data conversion of a photographic image or a graphic image, the halftone processing unit 317 uses a 190 Dot screen so that the photographic image or the graphic image has excellent tonality. When the processing target in the image data conversion is a character image, the halftone processing unit 317 uses a 230 Dot screen so that the character image can be printed clearly. The halftone processing unit 317 converts the image data, for example, according to the error diffusion method in such a way so as to acquire a high-resolution image the moire of which is suppressed appropriately.

If input image data is print-oriented image data generated by using the page description language, the halftone processing unit 317 converts the image data with the 190 Dot screen and the 230 Dot screen according to the error diffusion method. On the other hand, if the image to be printed is other than the character image of the document read by the reader unit 400, the halftone processing unit 317 uses a Copia screen in the image data conversion.

Figure 4A:
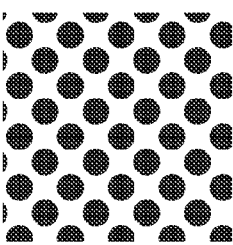
FIGS. 4A, 4B, 4C, and 4D illustrate images of representative screens.
Figure 4B:
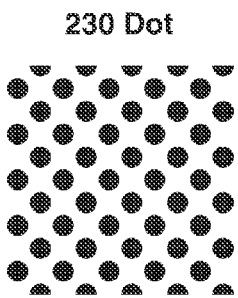
Figure 4C:
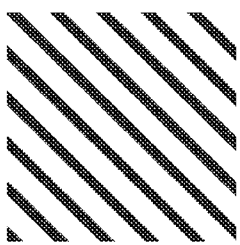
Figure 4D:
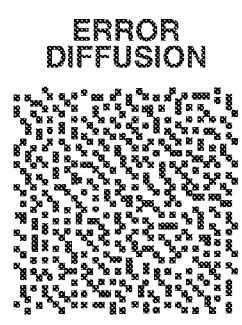

FIG. 4A is an enlarged view illustrating a halftone image obtained through processing using the 190 Dot screen. Similarly, FIG. 4B is an enlarged view illustrating a halftone image obtained through processing using the 230 Dot screen. FIG. 4C is an enlarged view illustrating a halftone image obtained through processing using the Copia screen. FIG. 4D is an enlarged view illustrating a halftone image obtained through processing according to the error diffusion method. The above-mentioned screens are mere examples. The present invention is not limited to the above-mentioned screens.

The image data having been subjected to the screening by the halftone processing unit 317 can be input to the printer unit 101. The printer unit 101 can form an image on the sheet 110 based on the input image data.

In the present exemplary embodiment, the image forming apparatus can perform automatic color tone correction processing to generate the ICC profile 309 that is usable to correct the tint of a mixed-color image. Further, the image forming apparatus can perform automatic gradation correction processing that includes a maximum density adjustment for controlling process conditions for forming an image having a target maximum density and a gradation adjustment for generating the gradation correction table 310 that can be used to correct the image gradation characteristics to ideal gradation characteristics.

A pattern generator 305, a process condition control unit 306, a γ LUT generation unit 307, and a multidimensional color table generation unit 308 perform the following operations when the image forming apparatus performs the automatic color tone correction processing or the automatic gradation correction processing.

The pattern generator 305 can output measuring image data. The printer unit 101 forms a measuring image in a non-image region between an image carried by the intermediate transfer belt 106 and a neighboring image based on the measuring image data having been output from the pattern generator 305.

If a user instructs automatic color tone correction processing using the spectral color sensor 200 via the operation unit 180, the pattern generator 305 outputs first measuring image data to cause the printer unit 101 to print a test pattern A. When the image forming apparatus performs the automatic color tone correction processing, the printer unit 101 prints a test chart A, for example, on three A4 sheets 110.

Further, if the user instructs automatic gradation correction processing using the spectral color sensor 200 via the operation unit 180, the pattern generator 305 outputs measurement second measuring image data to cause the printer unit 101 to print a test chart B. The test chart B includes a test chart B1 dedicated to the maximum density adjustment and a test pattern B2 dedicated to the gradation adjustment. When the image forming apparatus performs the automatic gradation correction processing using the spectral color sensor 200, the printer unit 101 prints the test chart B1 on a single A4 sheet 110 and prints the test chart B2 on four A4 sheets 110.

On the other hand, if the user instructs automatic gradation correction processing using the reader unit 400 via the operation unit 180, the pattern generator 305 outputs the second measuring image data to cause the printer unit 101 to print a pattern image. The pattern image includes a pattern image 1 dedicated to the maximum density adjustment and a pattern image 2 dedicated to the gradation adjustment. When the image forming apparatus performs the automatic gradation correction processing using the reader unit 400, the printer unit 101 prints the pattern image 1 on a single A3 sheet 110 and prints the pattern image 2 on two A3 sheets 110.

The multidimensional color table generation unit 308 can convert spectral reflectance data of the test chart A measured by the spectral color sensor 200 into XYZ tristimulus values by using a color matching function and can generate CMYK data based on the tristimulus values. Further, the multidimensional color table generation unit 308 can generate the ICC profile 309 based on target density data corresponding to the test chart A and the generated CMYK data.

The γ LUT generation unit 307 can convert spectral reflectance data of the test chart B measured by the spectral color sensor 200 into CMYK data by performing calculation processing similar to that described above. Then, the γ LUT generation unit 307 can generate the gradation correction table 310 for each screen and for each color based on CMYK image signal values input to the printer unit 101, for printing the test chart B, and the generated CMYK data. In the γ LUT generation unit 307, the color matching function of converting the spectral reflectance data into the CMYK data can be regarded as a first conversion condition.

Further, the γ LUT generation unit 307 can convert the luminance signal of the pattern image read by the reader unit 400 into density data with reference to a luminance density conversion table. Then, the γ LUT generation unit 307 can generate the gradation correction table 310 for each screen and for each color based on CMYK image signal values input to the printer unit 101, for printing the pattern image, and the density data. In the γ LUT generation unit 307, the luminance density conversion table that is usable to convert the luminance signal into the density data can be regarded as a second conversion condition.

For example, the γ LUT generation unit 307 can generate cyan density data based on the R component luminance signal with reference to a cyan-related luminance density conversion table. For example, the γ LUT generation unit 307 can generate magenta density data based on the G component luminance signal with reference to a magenta-related luminance density conversion table. For example, the γ LUT generation unit 307 can generate yellow density data based on the B component luminance signal with reference to a yellow-related luminance density conversion table. For example, the γ LUT generation unit 307 can generate black density data based on the G component luminance signal with reference to a black-related luminance density conversion table. The luminance density conversion tables corresponding to respective colors are stored in the ROM 301.

Figure 9:
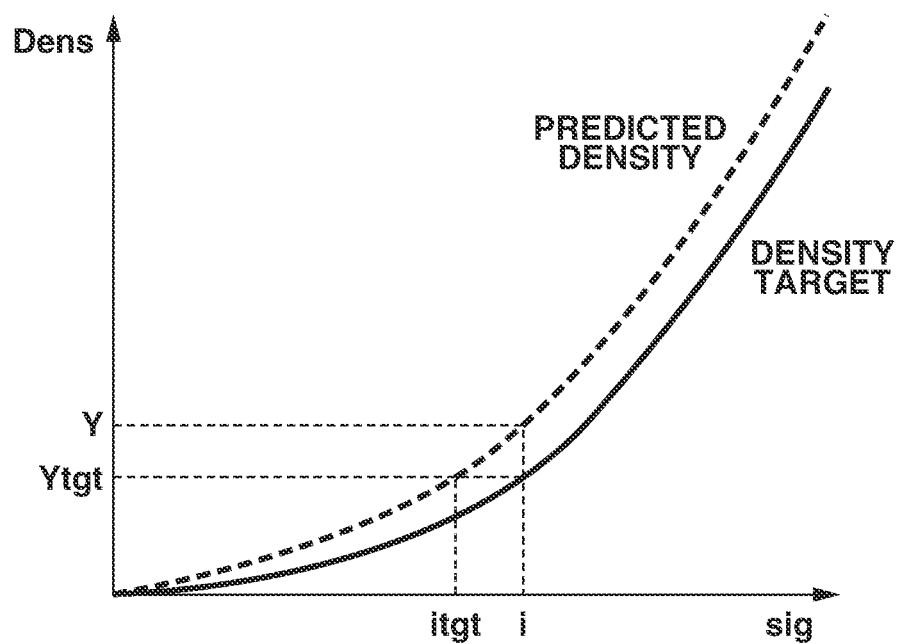
FIG. 9 is a graph illustrating a method for generating a gradation correction table.

FIG. 9 is a graph illustrating a correspondence relationship between image signal value (abscissa axis) and density (ordinate axis). A solid line represents ideal gradation characteristics (i.e., density target). A dotted line represents actual density characteristics (i.e., predicted density) obtained by linear interpolation based on a relationship between the image signal value of the measuring image data and the density measured by the reader unit 400 or the spectral color sensor 200. The γ LUT generation unit 307 generates the gradation correction table in such a way as to convert an image signal "i" into an image signal "itgt" to form an image having a target density Ytgt.

Figure 3:
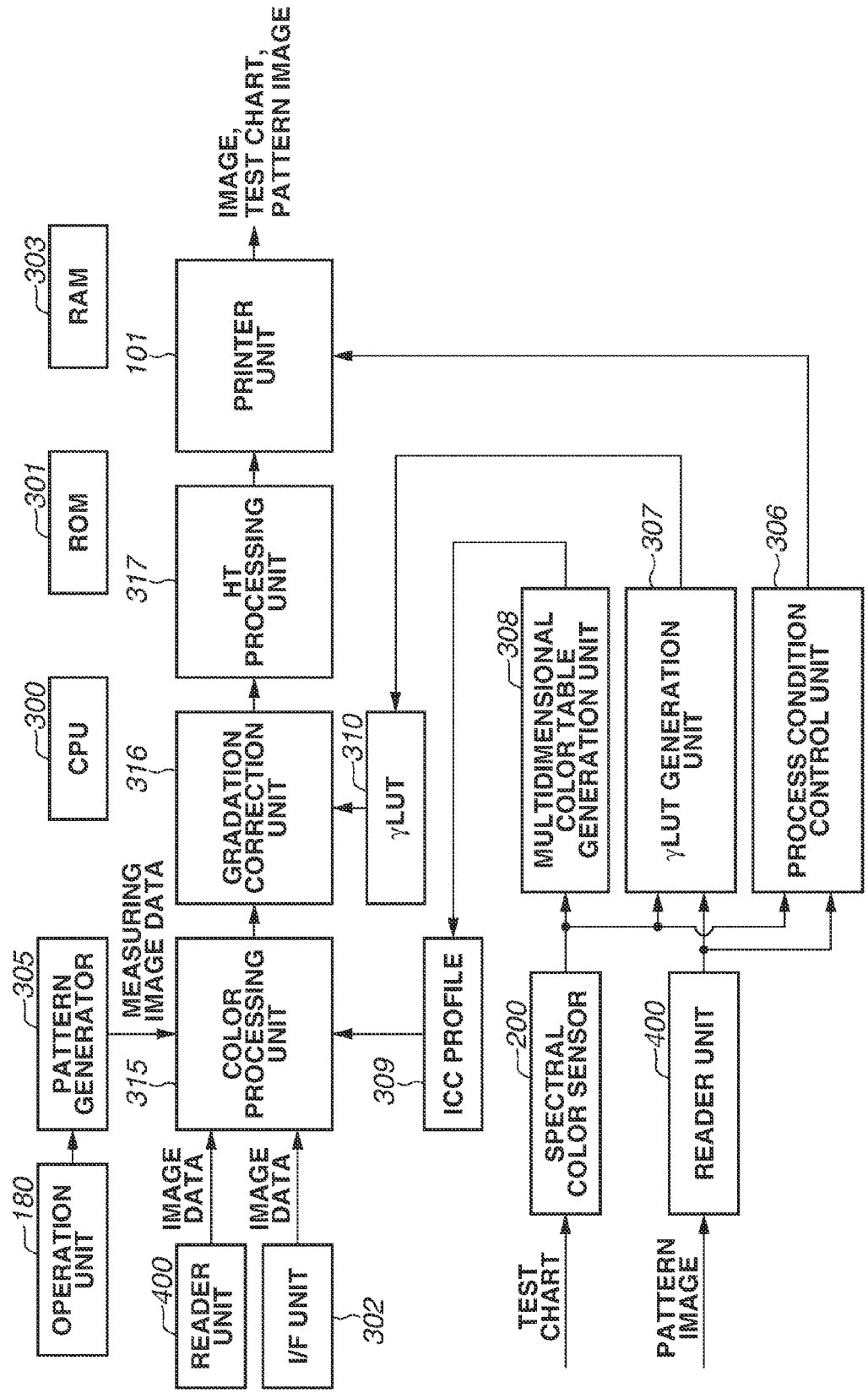
FIG. 3 is a control block diagram of the image forming apparatus.

Referring back to the control block diagram illustrated in FIG. 3, the process condition control unit 306 can convert spectral reflectance data of the test chart B measured by the spectral color sensor 200 into CMYK density data through calculation processing similar to the above-mentioned calculation processing. Further, the process condition control unit 306 can determine process conditions for forming an image having a target maximum density based on the CMYK image signal values input to the printer unit 101 to print the test chart B and the generated CMYK density data. The process conditions include operational information (e.g., laser power, charging bias, and developing bias) about respective stations 120, 121, 122, and 123. In the process condition control unit 306, the color matching function of converting the spectral reflectance data into the CMYK density data can be regarded as the first conversion condition.

Further, the process condition control unit 306 can convert the luminance signal of a pattern image read by the reader unit 400 into density data with reference to the luminance density conversion table. The γ LUT generation unit 307 can determine the process conditions for forming the image having the target maximum density based on the CMYK image signal values input to the printer unit 101 to print the pattern image and the converted density data. In the process condition control unit 306, the luminance density conversion table that is usable to convert the luminance signal into the density data can be regarded as the second conversion condition.

(Pattern Image 2 and Test Chart B2)

Figure 7:
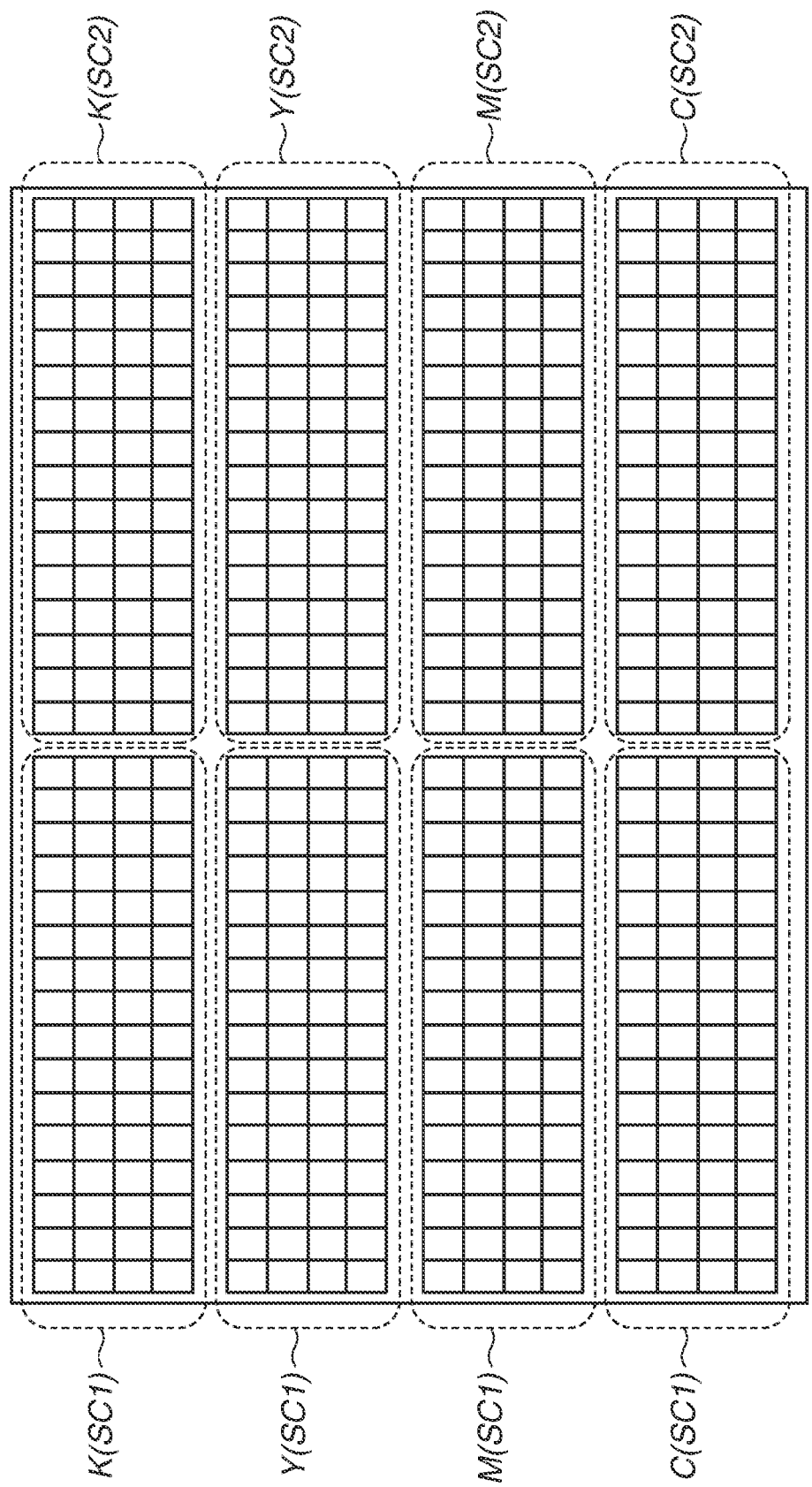
FIG. 7 is a schematic view illustrating a pattern image to be printed when the image forming apparatus performs automatic gradation correction processing using a reader unit.

FIG. 7 is a schematic view illustrating the pattern image 2 dedicated to the gradation adjustment, which is printed on the A3 sheet 110 by the printer unit 101. The pattern image 2 formed on the single sheet 110 includes pattern images of respective colors, which have been obtained through processing using two types of screens SC1 and SC2. Further, the pattern image 2 of each color can be formed based on, for example, 64 pieces of different image signals with respect to each of the screens SC1 and SC2. The reader unit 400 can read the entire surface of a document placed on the document positioning plate. Therefore, the pattern image 2 can be formed on the entire surface of the sheet 110.

Figure 8:
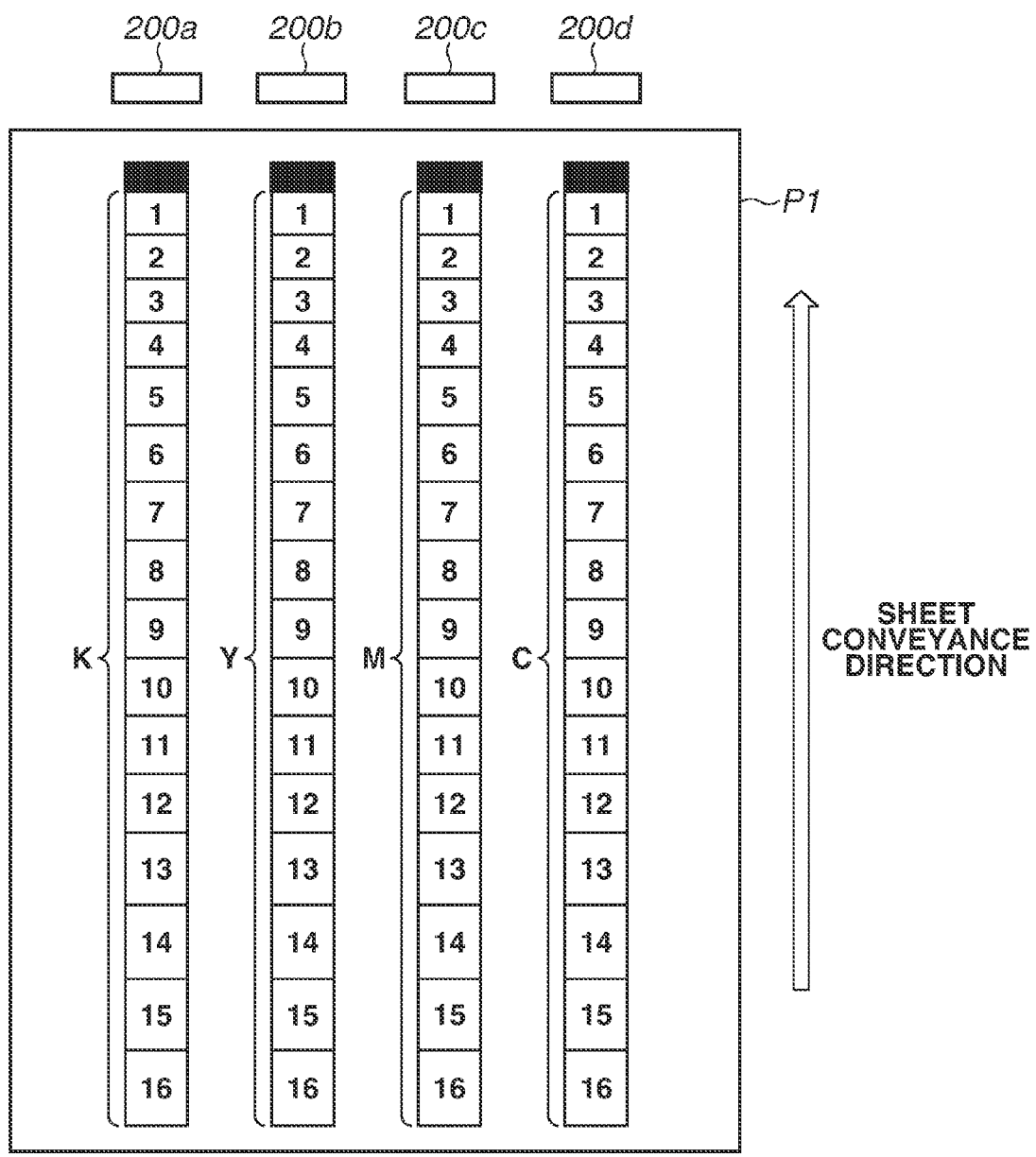
FIG. 8 is a schematic view illustrating a test chart to be printed when the image forming apparatus performs automatic gradation correction using a spectral color sensor.

FIG. 8 is a schematic view illustrating the test chart B2 dedicated to the gradation adjustment, which can be printed on the A4 sheet 110 by the printer unit 101. In addition to the test chart B2, a reference image (solid black) is formed on the sheet 110. The spectral color sensor 200 determines measurement start timing of the test chart B2 with reference to the reference image. The test chart B2 formed on the single sheet 110 includes a test chart obtained through processing using only the screen SC1, for example, for each color. Further, the test chart B2 of each color can be formed based on, for example, 16 pieces of different image signals. The spectral color sensors 200a, 200b, 200c, and 200d can measure only the test charts that have passed through the measurement positions thereof. Therefore, the number of the test charts B2 that can be formed on the sheet 110 is less than the number of the pattern images 2.

Even in a case where the pattern image 2 is printed on the A4 sheet 110, the number of the gradation adjustment pattern images 2 that can be formed on a single sheet 110 becomes greater than the number of the gradation adjustment test charts B2 that can be formed on a single sheet 110.

Therefore, the number of sheets 110 output from the image forming apparatus when the spectral color sensor 200 is used to perform the gradation adjustment is greater than the number of sheets 110 output from the image forming apparatus when the reader unit 400 is used to perform the gradation adjustment. Accordingly, performing the automatic gradation correction processing using the reader unit 400 is advantageous in a case where reducing the number of sheets is desired.

However, when the image forming apparatus performs the automatic gradation correction processing using the reader unit 400, the user is required to place the sheet 110, on which the pattern image is formed, on the document positioning plate of the reader unit 400 and press the reading start key. On the other hand, when the image forming apparatus performs the automatic gradation correction processing using the spectral color sensor 200, the image forming apparatus conveys the sheet 110, on which the test chart is printed, to the position of the spectral color sensor 200 and then measures the test chart. Accordingly, performing the automatic gradation correction processing using the spectral color sensor 200 is advantageous in a case where the user wants to save time.

In view of the foregoing, when the instructed correction is the automatic gradation correction, the operation unit 180 displays a key that enables a user to manually input an instruction to cause the image forming apparatus to perform the automatic gradation correction processing using the reader unit 400 or the automatic gradation correction processing using the spectral color sensor 200.

(Operation Unit 180)

Figure 5:
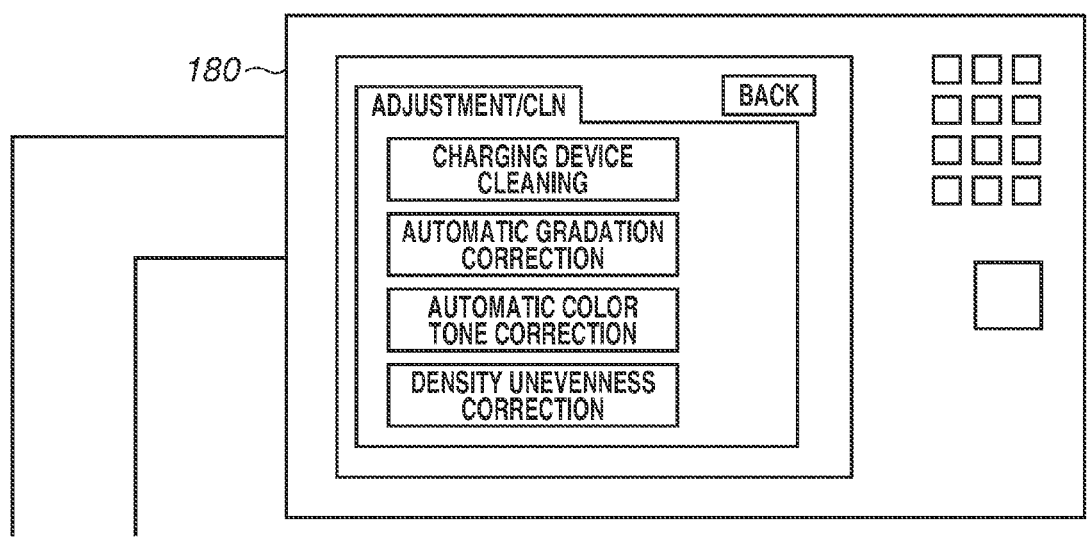
FIG. 5 illustrates an example of display contents displayed on an operation unit.

FIG. 5 illustrates display contents displayed on the operation unit 180. When a user inputs an adjustment mode implement command via the operation unit 180, the operation unit 180 displays a "charging device cleaning" key, an "automatic gradation correction" key, an "automatic color tone correction" key, and a "density unevenness correction" key on the liquid crystal screen thereof to enable the user to select a desired correction.

If the user presses the "automatic gradation correction" key, the image forming apparatus performs the automatic gradation correction processing. The automatic gradation correction processing to be performed by the image forming apparatus includes forming single-color measuring images on a sheet 110 and adjusting gradation characteristics of yellow, magenta, cyan, and black images based on a result of measurement of the measuring images acquired by the reader unit 400 or the spectral color sensor 200.

If the user has presses the "automatic color tone correction" key, the image forming apparatus performs the automatic color tone correction processing. The automatic color tone correction processing to be performed by the image forming apparatus includes forming multidimensional measuring images on a sheet 110 and correcting the multidimensional tint to a target tint based on a result of measurement of the measuring images acquired by the spectral color sensor 200.

Figure 6:
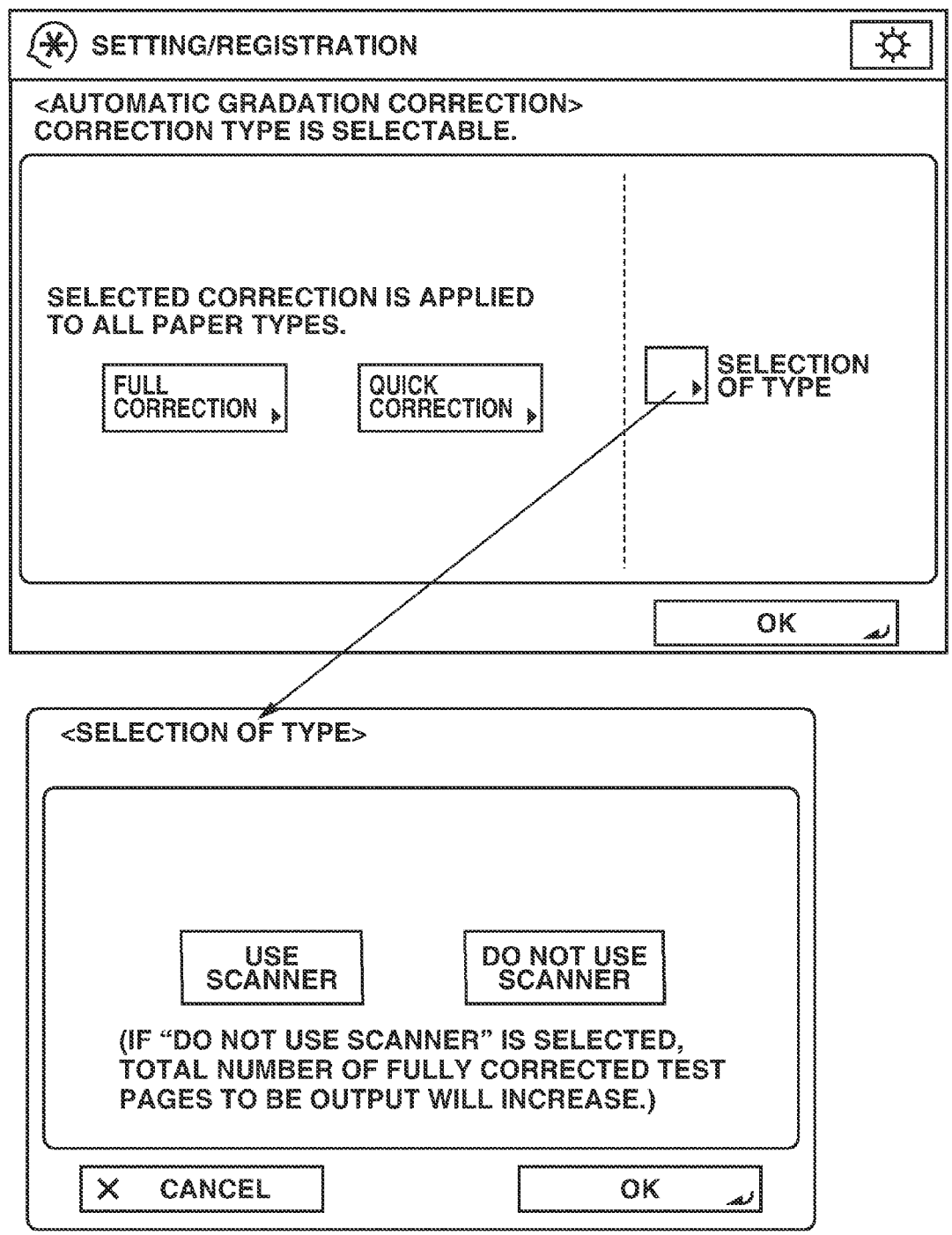
FIG. 6 illustrates display contents displayed when an automatic gradation correction is selected.

FIG. 6 illustrates an example of the screen that enables a user to determine whether to use the reader unit 400 or use the spectral color sensor 200 when the image forming apparatus performs the automatic gradation correction processing. If the user presses the "automatic gradation correction" key illustrated in FIG. 5, the liquid crystal screen of the operation unit 180 shifts into the display contents illustrated in FIG. 6.

If the user presses a "selection of type" key illustrated in FIG. 6, the operation unit 180 displays a pop-up screen on the liquid crystal screen thereof. The, if the user presses a "use scanner" key on the pop-up screen, the image forming apparatus performs the automatic gradation correction processing using the reader unit 400. On the other hand, if the user presses a "do not use scanner" key on the pop-up screen, the image forming apparatus performs the automatic gradation correction processing using the spectral color sensor 200.

In general, the image forming apparatus uses the spectral color sensor 200 if the implementation of the automatic gradation correction is instructed. More specifically, the image forming apparatus does not unconditionally perform the automatic gradation correction processing using the reader unit 400, because the color gamut that can be measured by the reader unit 400 is narrower that the color gamut measured by the spectral color sensor 200. In the automatic gradation correction, accurately measuring the intensity of wavelength in a range from 460 nm to 700 nm is required.

However, for example, the sensitivity of the reader unit 400 is lower than that of the spectral color sensor 200 at the wavelength around 500 nm. Therefore, the reader unit 400 cannot compensate a measurement result, for example, when the measurement target is a green measuring image formed on a sheet 110 having a smooth surface (e.g., a coated paper). This is the reason why the image forming apparatus does not perform the automatic gradation correction processing using the reader unit 400.

(Test Chart A)

Figure 10:
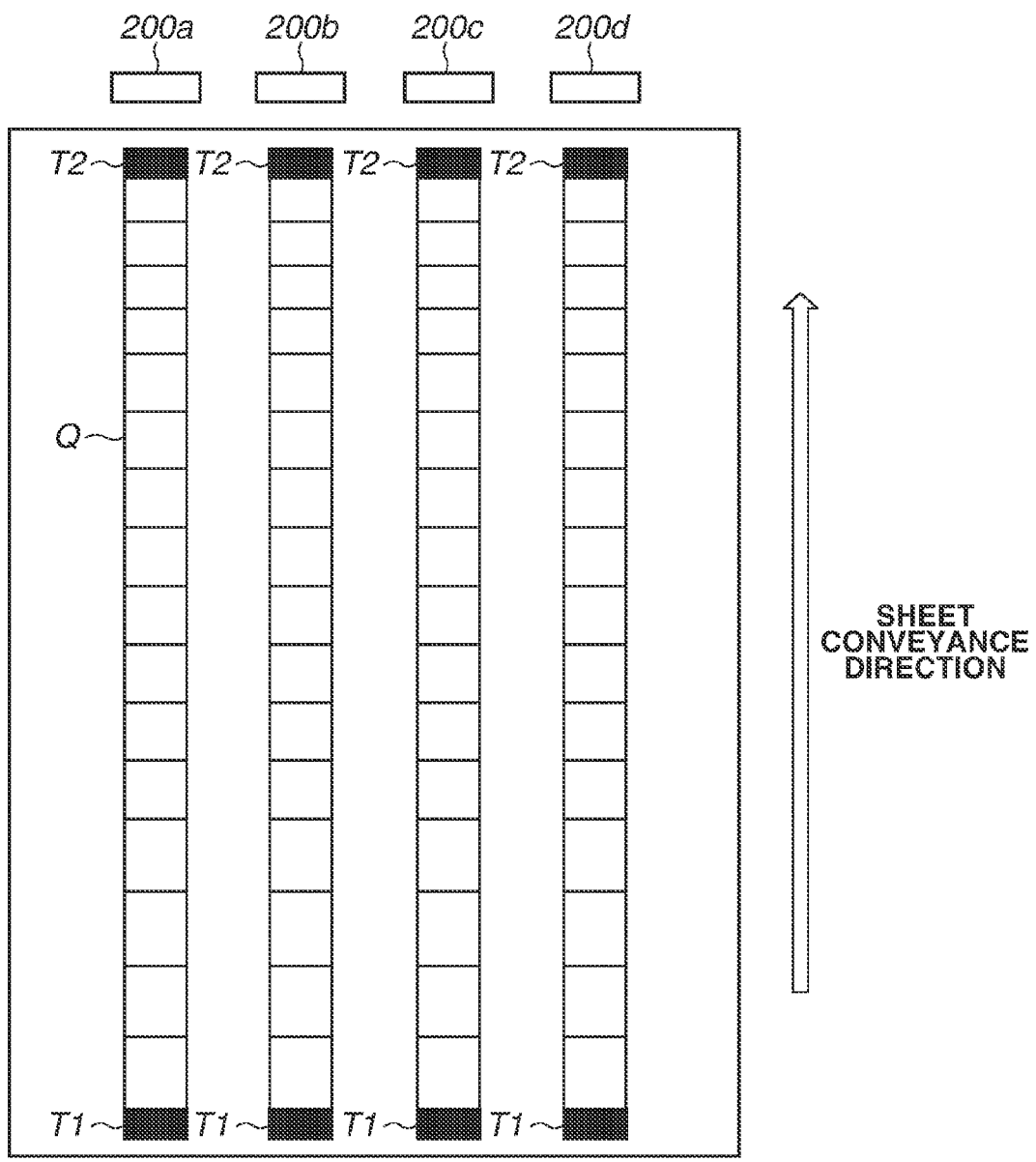
FIG. 10 is a schematic view illustrating a test chart to be printed when the image forming apparatus performs automatic color tone correction processing.

FIG. 10 is a schematic view illustrating the test chart A dedicated to the automatic color tone correction, which is printed on the A4 sheet 110 by the printer unit 101. The test chart A formed on the single sheet 110 includes a multidimensional measuring image formed with different color toners and a reference image (solid black) that can be referred to when the spectral color sensor 200 determines the measurement start timing of the multidimensional measuring image.

When the spectral color sensor 200 measures the tint of a multidimensional measuring image fixed on the sheet 110, the sheet 110 once passes through the measurement position of the spectral color sensor 200 and enters the reversing unit 136. Then, the sheet 110 stays in the reversing unit 136 for a predetermined time so that the temperature of the sheet 110 becomes equal to or less than a predetermined temperature. More specifically, the molecular structure of a coloring material (e.g., toner or ink) deforms when it is heated. The light reflection absorption characteristics and the spectral reflectance change correspondingly. The density data of the test chart B2 in the wavelength region in which the thermal deformation occurs can be disregarded in the above-mentioned calculation process. Therefore, when the image processing apparatus performs the automatic color tone correction processing, the sheet 110 on which the multidimensional measuring image is formed stays in the reversing unit 136 for the predetermined time.

When the predetermined time elapses, the sheet 110 is conveyed toward the measurement position of the spectral color sensor 200 by the roller of the reversing unit 136. The spectral color sensor 200 measures the measuring image.

(Flowchart)

Figure 11:
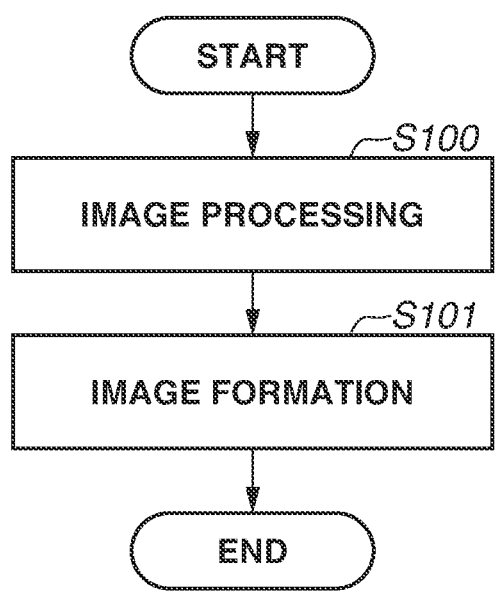
FIG. 11 is a flowchart illustrating an image forming operation.

Next, an image forming operation that can be performed by the image forming apparatus to form an image on the sheet 110 based on image data received from the reader unit 400 or an external apparatus will be described in detail below with reference to a flowchart illustrated in FIG. 11. If the CPU 300 receives image data from the reader unit 400 or from the I/F unit 302, the CPU 300 reads the control program stored in the ROM 301 and performs the image forming operation.

First, in step S100, the CPU 300 performs various image processing on the input image data. More specifically, in step S100, the color processing unit 315 converts the image data into print-oriented image data (i.e., CMYK image data). Then, the color processing unit 315 converts the image data with reference to the ICC profile 309. Subsequently, the gradation correction unit 316 identifies a screen suitable for the image data and converts the image data with reference to the gradation correction table (310) corresponding to the identified screen. The halftone processing unit 317 performs screening suitable for the image data converted by the gradation correction unit 316, which is optimized considering the type of the processed image.

In step S201, the color processing unit 315 is functionally operable as a conversion unit configured to convert image data of a plurality of color components representing one pixel with reference to a multidimensional table. Further, in step S201, the gradation correction unit 316 is functionally operable as a correction unit configured to correct image data with reference to a one-dimensional table corresponding to each of a plurality of color components. The ICC profile 309 can be regarded as the multidimensional table. The γ LUT 310 can be regarded as the one-dimensional table.

Next, in step S101, the CPU 300 controls the printer unit 101 to form an image on a sheet 110 based on the image data. More specifically, in step S101, the printer unit 101 is controlled based on the process conditions having been set by the process condition control unit 306 in such a way as to form an image on the sheet 110 based on the image data output from the halftone processing unit 317.

Figure 12:
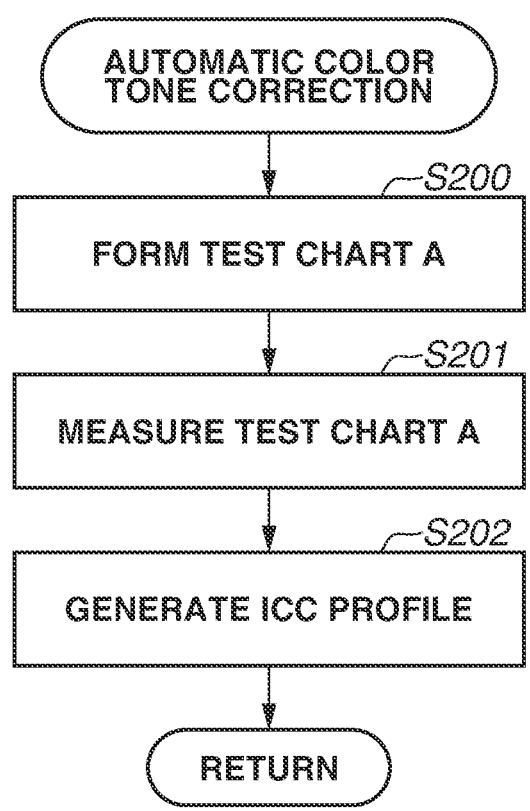
FIG. 12 is a flowchart illustrating the automatic color tone correction processing.

Next, the automatic color tone correction processing that can be performed by the CPU 300 when a user presses the "automatic color tone correction" key on the operation unit 180 will be described in detail below with reference to a flowchart illustrated in FIG. 12. If the "automatic color tone correction" key of the operation unit 180 is pressed, the CPU 300 reads the control program stored in the ROM 301 and performs the automatic color tone correction processing.

In step S200, the CPU 300 causes the printer unit 101 to form the test chart A on the sheet 110 having been fed. More specifically, in step S200, the pattern generator 305 inputs measuring image data corresponding to the test chart A to the color processing unit 315. The color processing unit 315 converts the measuring image data input from the pattern generator 305 with reference to the ICC profile 309 stored beforehand. Subsequently, the color processing unit 315 outputs the converted measuring image data to the gradation correction unit 316. The gradation correction unit 316 converts the measuring image data with reference to the gradation correction table 310 and outputs the converted measuring image data to the printer unit 101 via the HT processing unit 317. The printer unit 101 forms the test chart A on the sheet 110 based on the input image data.

Next, in step S201, the CPU 300 causes the spectral color sensor 200 to measure the test chart A. If the test chart A is conveyed to the reversing unit 136, the CPU 300 causes the test chart to stay for a while in the reversing unit 136. If a predetermined time elapses, the CPU 300 controls the conveyance rollers to convey the test chart A from the reversing unit 136 to the measurement position of the spectral color sensor 200. Then, the CPU 300 causes the spectral color sensor 200 to measure the test chart A and acquire spectral reflectance data while the test chart A is passing through the measurement position of the spectral color sensor 200. Subsequently, the test chart A is discharged to the discharge tray. In other words, in step S201, the spectral color sensor 200 is functionally operable as a measurement unit configured to measure the measuring image formed on the sheet 110.

Next, in step S202, the CPU 300 generates an ICC profile based on the spectral reflectance data of the test chart A measured by the spectral color sensor 200 and updates the ICC profile 309 stored beforehand. More specifically, in step S202, the multidimensional color table generation unit 308 calculates CMYK density data DA based on the spectral reflectance data and generates an ICC profile based on target CMYK density data (DAtgt) corresponding to the test chart A and the calculated density data DA.

In the processing in steps S200 to S202, the CPU 300 and the multidimensional color table generation unit 308 are functionally operable as a first generation unit configured to generate a multidimensional table based on a result of measurement of a first multidimensional measuring image.

Figure 13:
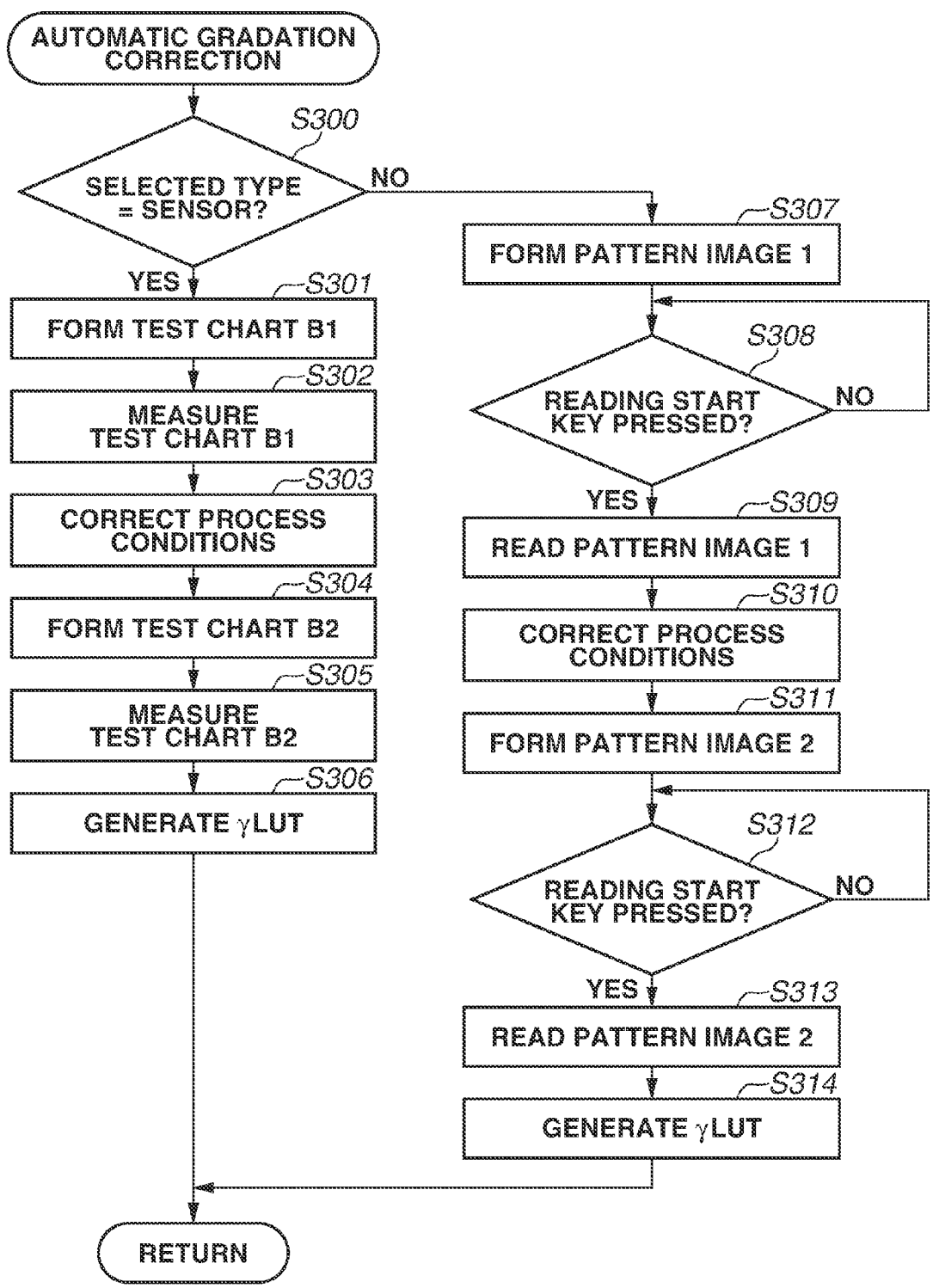
FIG. 13 is a flowchart illustrating the automatic gradation correction processing.

Next, the automatic gradation correction that is performed by the CPU 300 when a user presses the "automatic gradation correction" key on the operation unit 180 will be described in detail below with reference to a flowchart illustrated in FIG. 13. When the "automatic gradation correction" key on the operation unit 180 is pressed, the CPU 300 reads the control program stored in the ROM 301.

First, in step S300, the CPU 300 causes the operation unit 180 to display the screen illustrated in Fig. and prompts a user to determine whether to use the spectral color sensor 200 or the reader unit 400. More specifically, in step S300, if the user presses the "selection of type" key on the liquid crystal screen of the operation unit 180, the CPU 300 causes the operation unit 180 to display the pop-up screen as illustrated in FIG. 6. Then, if the "do not use scanner" key is pressed on the pop-up screen, the CPU 300 performs the automatic gradation correction processing using the spectral color sensor 200.

If the implementation of the automatic gradation correction processing using the spectral color sensor 200 is instructed (Yes in step S300), then in step S301, the CPU 300 causes the printer unit 101 to form the test chart B1 on the sheet 110. More specifically, in step S301, the pattern generator 305 inputs measuring image data corresponding to the test chart B1 to the color processing unit 315. The color processing unit 315 converts the measuring image data input by the pattern generator 305 with reference to the prestored ICC profile 309. Then, the color processing unit 315 outputs the converted measuring image data to the gradation correction unit 316. The gradation correction unit 316 converts the measuring image data with reference to the gradation correction table 310 and outputs the converted measuring image data to the printer unit 101 via the HT processing unit 317. The printer unit 101 forms the test chart B1 on the sheet 110 based on the input image data.

The test chart B1 is, for example, constituted by predetermined image signal values, which can be formed based on five different process conditions. For example, the printer unit 101 forms the test chart B1 by selecting one of five levels of the laser light intensity of the exposure apparatus 108.

Next, in step S302, the CPU 300 causes the spectral color sensor 200 to measure the test chart B1 formed on the sheet 110. After the test chart B1 is conveyed to the reversing unit 136, the CPU 300 causes the test chart B1 to stay for a predetermined time in the reversing unit 136. After the predetermined time elapses, the CPU 300 controls the conveyance rollers to convey the test chart B1 from the reversing unit 136 to the measurement position of the spectral color sensor 200. Then, the CPU 300 causes the spectral color sensor 200 to measure the test chart B1 and acquire spectral reflectance data, while the test chart B1 is passing through the measurement position of the spectral color sensor 200. Subsequently, the test chart B1 is discharged to the discharge tray.

Next, in step S303, the CPU 300 determines process conditions for forming an image having a target maximum density based on the spectral reflectance data of the test chart B1 measured by the spectral color sensor 200. More specifically, in step S303, the process condition control unit 306 calculates CMYK density data DB1 based on the spectral reflectance data for each test chart B1. Then, the process condition control unit 306 interpolates the density data DB1 of each test chart B1 and determines a correspondence relationship between the process conditions and the density data. Then, the process condition control unit 306 determines the process conditions for forming the image having the target maximum density based on the determined correspondence relationship. The process condition control unit 306 interpolates density data corresponding to laser light intensity that has five levels. Then, the process condition control unit 306 determines the laser light intensity required to form the image having the target maximum density based on a correspondence relationship between the laser light intensity and the density data.

Next, in step S304, the CPU 300 controls the printer unit 101 based on the process conditions determined in step S303 and causes the printer unit 101 to form the test chart B2 on the sheet 110. More specifically, in step S304, the pattern generator 305 inputs measuring image data corresponding to the test chart B2 to the color processing unit 315. Similar to the above-mentioned formation of the test print B1, the color processing unit 315 outputs the measuring image data to the printer unit 101. The printer unit 101 forms the test chart B2 on the sheet 110 based on the image data.

The test chart B2 is constituted by 16-gradation image signal values, which can be formed based on the process conditions determined in step S303, for each screen and for each color.

Next, in step S305, the CPU 300 causes the spectral color sensor 200 to measure the test chart B2 formed on the sheet 110. After the test chart B2 is conveyed to the reversing unit 136, the CPU 300 causes the test chart B2 to stay for a predetermined time in the reversing unit 136. After the predetermined time elapses, the CPU 300 controls the conveyance rollers to convey the test chart B2 from the reversing unit 136 to the measurement position of the spectral color sensor 200. Then, the CPU 300 causes the spectral color sensor 200 to measure the test chart B2 and acquires spectral reflectance data, while the test chart B2 is passing through the measurement position of the spectral color sensor 200. Subsequently, the test chart B2 is discharged to the discharge tray. The test chart B2 is formed on each of four pages. Thus, the CPU 300 repeats the processing in steps S304 and S305 until the measurement of the test chart B2 for four pages completes.

Next, in step S306, the CPU 300 generates the gradation correction table 310 based on the spectral reflectance data of the test chart B2 measured by the spectral color sensor 200. In step S306, the γ LUT generation unit 307 calculates CMYK density data DB2 with reference to the spectral reflectance data. Then, the γ LUT generation unit 307 determines gradation characteristics based on the density data DB2 of the test chart B2. Further, the γ LUT generation unit 307 generates a revision table in such a way as to change the gradation characteristics to ideal gradation characteristics. Then, the γ LUT generation unit 307 updates the gradation correction table 310 based on the gradation correction table 310 stored beforehand and the revision table.

Then, the CPU 300 terminates the automatic gradation correction processing using the spectral color sensor 200. In the processing in steps S304 to S306, the CPU 300 and the γ LUT generation unit 307 are functionally operable as a second generation unit configured to generate the one-dimensional table based on the result of the measurement of the second measuring image for each of a plurality of color components.

In step S300, if the user instructs the implementation of the automatic gradation correction processing via the operation unit 180 without pressing the "selection of type" key on the liquid crystal screen of the operation unit 180, the CPU 300 performs the automatic gradation correction processing using the spectral color sensor 200. More specifically, unless the user selects the automatic gradation correction processing using the reader unit 400, the image processing apparatus automatically selects the automatic gradation correction processing using the spectral color sensor 200. With this configuration, it is unnecessary for the user to place the discharged sheet 110 on the reader unit 400 and press the reading start key. In other words, the user-friendliness can be improved because the user can save the trouble.

If the "do not use scanner" key is pressed on the pop-up screen in step S300, the CPU 300 performs the automatic gradation correction processing using the reader unit 400.

More specifically, if the implementation of the automatic gradation correction processing using the reader unit 400 is instructed (No in step S300), then in step S307, the CPU 300 causes the printer unit 101 to form the pattern image 1 on the sheet 110. In step S307, the pattern generator 305 inputs measuring image data corresponding to the pattern image 1 to the color processing unit 315. The color processing unit 315 converts the measuring image data input by the pattern generator 305 with reference to the prestored ICC profile 309. Then, the color processing unit 315 outputs the converted measuring image data to the gradation correction unit 316. The gradation correction unit 316 converts the measuring image data with reference to the gradation correction table 310 and outputs the converted measuring image data to the printer unit 101 via the HT processing unit 317. The printer unit 101 forms the pattern image on the sheet 110 based on the input image data, and discharges the sheet 110 to the discharge tray.

Next, in step S308, the CPU 300 waits until the reading start key on the operation unit 180 is pressed. If the user places the sheet 110, on which the pattern image 1 is formed, on the document positioning plate and presses the reading start key (YES in step S308), then in step S309, the CPU 300 causes the reader unit 400 to read the pattern image 1 formed on the sheet 110. Further, in step S309, the reader unit 400 outputs the luminance signal corresponding to the pattern image 1.

Next, in step S310, the CPU 300 determines process conditions for forming an image having a target maximum density based on the spectral reflectance data of the pattern image 1 measured by the reader unit 400. More specifically, in step S310, the process condition control unit 306 calculates CMYK density data DP1 based on the spectral reflectance data. Then, the process condition control unit 306 interpolates the density data DP1 of the pattern image 1 and determines a correspondence relationship between the process conditions and the density data. Then, the process condition control unit 306 determines the process conditions for forming the image having the target maximum density based on the determined correspondence relationship.

Next, in step S311, the CPU 300 controls the printer unit 101 based on the process conditions determined in step S310 and causes the printer unit 101 to form the pattern image 2 on the sheet 110. More specifically, in step S311, the pattern generator 305 inputs measuring image data corresponding to the pattern image 2 to the color processing unit 315. The measuring image data is output to the printer unit 101, similar to the above-mentioned formation of the pattern image 1. The printer unit 101 forms the pattern image 2 on the sheet 110 based on the image data.

The pattern image 2 is constituted by 64-gradation image signal values, for each screen and for each color, based on the process conditions determined in step S310. Further, the pattern image 2 is formed for two pages. Therefore, the CPU 300 causes the printer unit 101 to measure the pattern image 2 formed on each of two pages.

Next, in step S312, the CPU 300 waits until the reading start key on the operation unit 180 is pressed. If the user places the sheet 110, on which the pattern image 2 is formed, on the document positioning plate and presses the reading start key (YES in step S312), then in step S313, the CPU 300 causes the reader unit 400 to read the pattern image 2 formed on the sheet 110. The pattern image 2 is formed for two pages. Thus, the operation of the CPU 300 does not proceed to step S314 until the reader unit 400 completes the reading of the pattern image 2 from each of two pages.

Next, in step S314, the CPU 300 generates the gradation correction table 310 based on the luminance signal of the pattern image 2 output from the reader unit 400. More specifically, in step S314, the γ LUT generation unit 307 calculates CMYK density data DP2 with reference to the luminance signal. Then, the γ LUT generation unit 307 determines gradation characteristics based on the density data DP2 of the pattern image 2. Further, the γ LUT generation unit 307 generates a revision table in such a way as to change the gradation characteristics to ideal gradation characteristics. Then, the γ LUT generation unit 307 updates the gradation correction table 310 based on the prestored gradation correction table 310 and the revision table.

Then, the CPU 300 terminates the automatic gradation correction processing using the reader unit 400. In the processing in steps S311 to S314, the CPU 300 and the γ LUT generation unit 307 are functionally operable as a third generation unit configured to acquire reading data of the pattern image for each of a plurality of color components and generate a one-dimensional table based on the reading data.

Further, in step S300, the operation unit 180 is functionally operable as an input unit via which a user can manually input information indicating whether to use the spectral color sensor 200 or the reader unit 400 to generate the γ LUT. Further, the CPU 300 is functionally operable as a determination unit configured to determine whether to generate the γ LUT 310 by using the spectral color sensor 200 or generate the γ LUT 310 by using the reader unit 400 with reference to information input via the operation unit 180.

According to the above-mentioned configuration, each user can select the automatic gradation correction processing using the spectral color sensor 200 or the automatic gradation correction processing using the reader unit 400. Thus, it is possible to cause the image forming apparatus to perform the image quality adjustment control that is excellent in usability.

Figure 14:
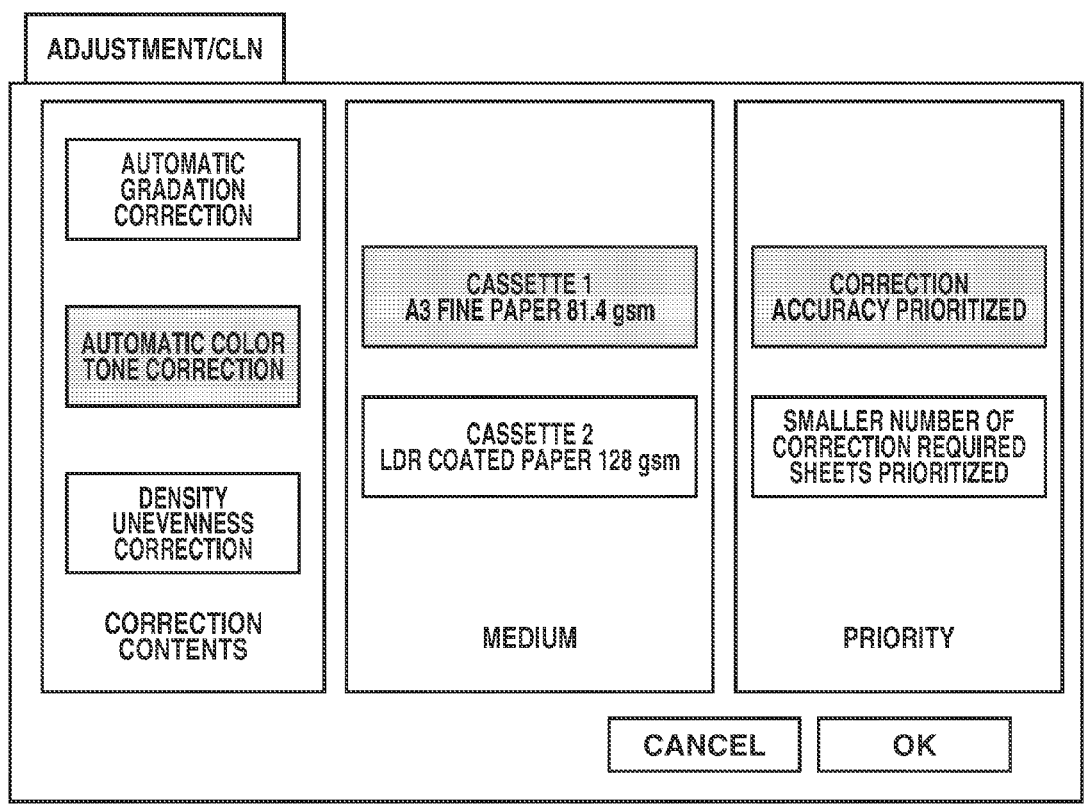
FIG. 14 illustrates a modified example of display contents displayed on the operation unit.

FIG. 14 illustrates an example of the screen display, which is displayed on the liquid crystal screen when a user presses the "automatic color tone correction" key and enables the user to select the type of a sheet on which a test chart is to be formed and correction accuracy.

Enabling the user to select the type of sheets stored in the cassette 113 is useful because it is possible to form an ICC profile for correcting the tint of an image formed on an arbitrary sheet to a target tint.

Further, the screen illustrated in FIG. 14 includes a "smaller number of correction required sheets prioritized" key, which can be pressed if it is desired to reduce the number of sheets required in the automatic color tone correction processing. Accordingly, for example, it can be configured to form the test pattern A for only two types (e.g., the 190 Dot screen and the 230 Dot screen). In this case, the number of sheets to be consumed in the automatic color tone correction processing can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-157610, filed Aug. 7, 2015, which is hereby incorporated by reference herein in its entirety.

What is claimed is:

1. An image forming apparatus comprising:
    a conversion unit configured to convert image data of a plurality of color components indicating one pixel based on a multidimensional table;
    a correction unit configured to correct the converted image data based on one-dimensional tables, wherein each one-dimensional table respectively corresponds to the plurality of color components;
    an image forming unit configured to convey a sheet along a conveyance path and form an image on the sheet based on the corrected image data;
    a measurement unit provided to the conveyance path and configured to measure a measuring image formed on the sheet;
    a first generation unit configured to control the image forming unit to form a first measuring image on the sheet, control the measurement unit to measure the first measuring image, and generate the multidimensional table based on a result of the measurement of the first measuring image, wherein the first measuring image is a multi-color image;
    a second generation unit configured to control the image forming unit to form a second measuring image for each of the plurality of color components on the sheet, control the measurement unit to measure the second measuring image, and generate the one-dimensional table based on a result of the measurement of the second measuring image;
    a reading unit configured to read a pattern image formed on the sheet placed on a document positioning plate by a user;
    a third generation unit configured to control the image forming unit to form a pattern image for each of the plurality of color components on the sheet, control the reading unit to read the pattern image, and generate the one-dimensional table based on a result of the reading of the pattern image;
    an input unit configured to input user instruction information indicating whether to use the measurement unit or to use the reading unit to generate the one-dimensional table; and
    a determination unit configured to determine, based on the user instruction information input by the input unit, whether to cause the second generation unit to generate the one-dimensional table or cause the third generation unit to generate the one-dimensional table.

2. The image forming apparatus according to claim 1, further comprising:
    a conveyance unit configured to convey the sheet; and
    a fixing unit configured to fix the image on the sheet,
    wherein the measurement unit is provided on a downstream side of the fixing unit in a direction in which the sheet is conveyed, and
    wherein the measurement unit measures the measuring image on the sheet being conveyed by the conveyance unit.

3. The image forming apparatus according to claim 1, wherein a number of the sheets on which the pattern image is formed by the image forming unit when the third generation unit generates the one-dimensional table is less than a number of the sheets on which the second measuring image is formed by the image forming unit when the second generation unit generates the one-dimensional table.

4. The image forming apparatus according to claim 1, wherein the measurement unit outputs data relating to spectral reflectance of the measuring image based on reflection light from the measuring image, and
wherein the reading unit outputs luminance information about the pattern image based on reflection light from the pattern image.

5. The image forming apparatus according to claim 4, wherein the second generation unit converts the data relating to the spectral reflectance of the second measuring image output from the measurement unit into data relating to a density of the second measuring image based on a first conversion condition, and generates the one-dimensional table based on the data relating to the density of the second measuring image, and
wherein the third generation unit converts the luminance information about the pattern image output from the reading unit into data relating to a density of the pattern image based on a second conversion condition, which is different from the first conversion condition, and generates the one-dimensional table based on the data relating to the density of the pattern image.

6. The image forming apparatus according to claim 1, wherein the reading unit includes a sensor that reads the pattern image on the sheet, and
wherein the reading unit causes the sensor to move and read the pattern image on the sheet.

7. The image forming apparatus according to claim 1, wherein the measurement unit includes an irradiation unit configured to irradiate the measuring image with light, a diffraction grating that diffracts reflection light from the measuring image to generate a plurality of wavelength components of light, and a light reception unit configured to receive the plurality of wavelength components of light diffracted and generated by the diffraction grating.

8. An image forming apparatus having a reader for reading an original document, the image forming apparatus comprising:
an image processor configured to perform image processing to image data, wherein the image processing includes a first image processing in which the image processor converts image data of a plurality of color components indicating one pixel based on a multidimensional table, and a second image processing in which the image processor converts the image data based on one-dimensional tables;
a printer configured to convey a sheet along a conveyance path and form an image on the sheet based on the image data to which the image processor performs the image processing;
a sensor provided to the conveyance path and configured to measure a measuring image formed on the sheet; and
a controller configured to execute a plurality of correction controls including a color tone correction control to generate the multidimensional table and a gradation correction control to generate the one-dimensional tables,
wherein, in the color tone correction control, the controller generates the multidimensional table based on the measurement result acquired by the sensor,
wherein the reader is not utilized for generating the multidimensional table,
wherein the controller acquires user instruction information, selects a gradation correction mode from a first gradation correction mode and a second gradation correction mode based on the user instruction information, and executes the gradation correction control based on the selected gradation correction mode,
wherein the controller executes tasks in the first gradation correction mode, and wherein the first gradation correction mode tasks include a first image forming task to form a plurality of pattern images with different colors on first sheets by controlling the printer, a reading task to read the plurality of pattern images by controlling the reader, and a first generating task to generate the one-dimensional tables based on the reading result of the plurality of pattern images,
wherein the controller executes tasks in the second gradation correction mode and wherein the second gradation correction mode task include a second image forming task to form a plurality of measuring images with different colors on second sheets by controlling the printer, a measuring task to measure the plurality of measuring images by controlling the sensor, and a second generating task to generate the one-dimensional tables based on the measuring result of the plurality of the measuring images, and
wherein a number of the first sheets is less than a number of the second sheets.

9. The image forming apparatus according to claim 8, wherein the printer includes conveyance rollers configured to convey the sheet, and a heater configured to fix the image on the sheet by heating the sheet, and
wherein the sensor is provided on a downstream side of the heater in a direction of the sheet to be conveyed.

10. The image forming apparatus according to claim 8, wherein the sensor determines data related to a spectral reflectance of the measuring image based on reflected light from the measuring image, and
wherein the reader determines luminance data related to a pattern image based on reflected light from the pattern image.

11. The image forming apparatus according to claim 10, wherein, in the second generating task, the controller coverts data related to each spectral reflectance of the plurality of measuring images output from the sensor based on a first conversion condition, and generates the one-dimensional tables based on the converted data corresponding to the plurality of measuring images.

12. The image forming apparatus according to claim 8, wherein the sensor includes a light-emitting element configured to emit light, a diffraction grating configured to disperse the reflected light from the measuring image, and a light-reception unit configured to receive the reflected light dispersed by the diffraction grating.

13. A controlling method of controlling an image forming apparatus, wherein the image forming apparatus includes:
an image processor configured to perform image processing including a first image processing to convert image data of a plurality of color components indicating one pixel based on a multidimensional table and a second image processing to convert the image data based on one-dimensional tables,
a reader configured to read an original document, a printer configured to convey a sheet along a conveyance path and form an image on the sheet based on the image data to which the image processor performs the image processing, and a sensor provided on the conveyance path and configured to measure a measuring image formed on the sheet, wherein the image forming apparatus executes a plurality of correction controls including a color tone correction control to generate the multidimensional table, a gradation correction control to generate the one-dimensional tables, the controlling method comprising:

(i) executing the color tone correction control, wherein the color tone correction control includes:

forming first measuring images including mixed-color images on first sheets, measuring the first measuring images by controlling the sensor, generating the multidimensional table based on the measuring result of the first measuring images, wherein the reader is not used for generating the multidimensional table, acquiring used instruction information, and selecting, based on the user instruction information, a gradation correction mode from a first gradation correction mode and a second gradation correction mode, and (ii) executing the gradation correction control based on the selected gradation correction mode, wherein the first gradation correction mode includes:

forming pattern images having different colors on second sheets, reading the pattern images by controlling the reader, and generating the one-dimensional tables based on the reading results of the pattern images, wherein the second gradation correction mode includes:

forming second measuring images having different colors on third sheets, measuring the second measuring images by controlling sensor, and generating the one-dimensional tables based on the measurement result of the second measuring images, and wherein a number of the second sheets is less than a number of the third sheets.

* * * * *